Feb. 2, 1954  F. CARTLIDGE  2,667,938
DRIVE MECHANISM FOR TRACTOR TREADS
Filed March 26, 1952  2 Sheets-Sheet 1

Inventor
Frank Cartlidge
By: Murray A. Gleeson Atty.

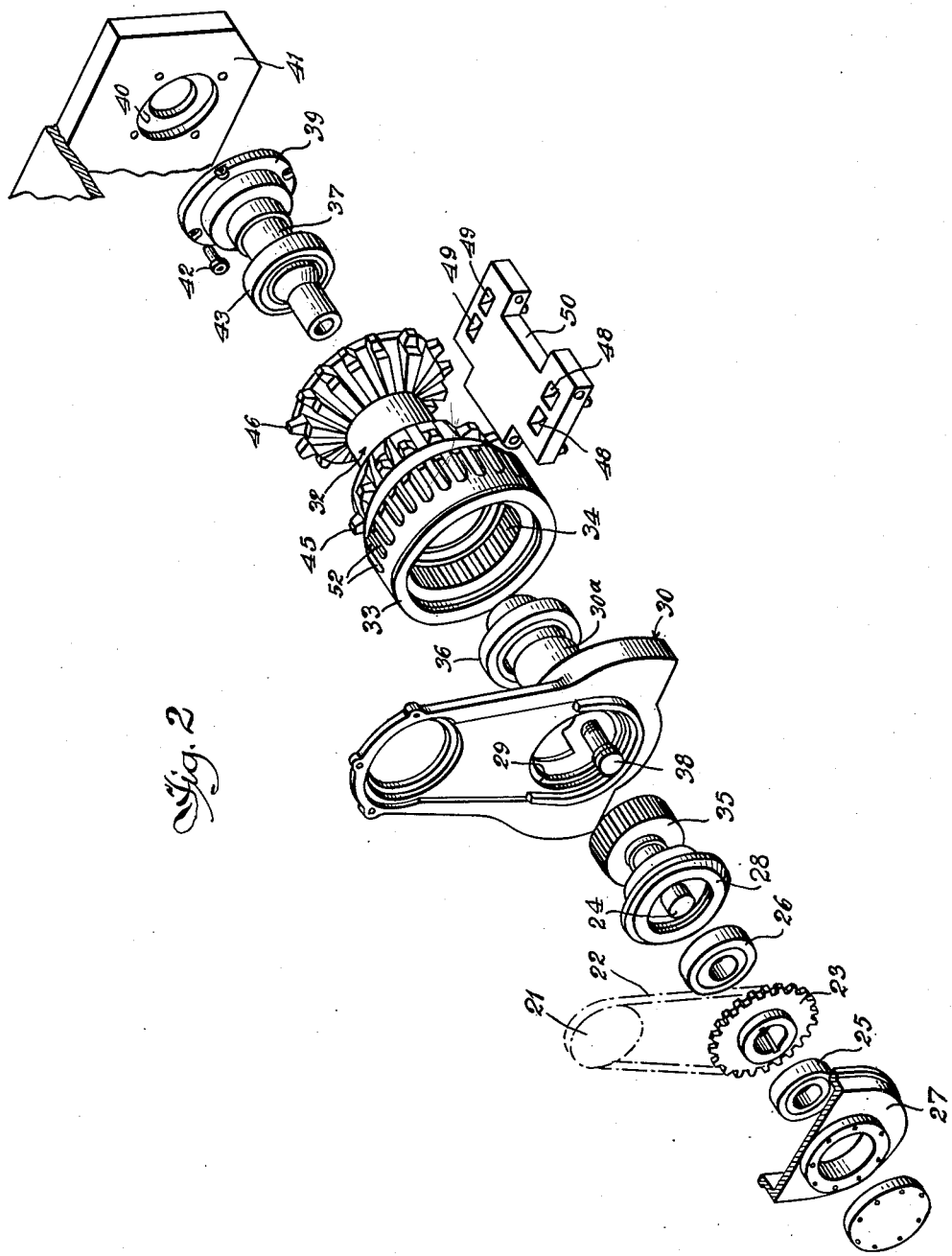

Patented Feb. 2, 1954

2,667,938

UNITED STATES PATENT OFFICE 2,667,938

DRIVE MECHANISM FOR TRACTOR TREADS

Frank Cartlidge, Chicago, Ill., assignor to Goodman Manufacturing Company, Chicago, Ill., a corporation of Illinois Application March 26, 1952, Serial No. 278,650

1 Claim. (Cl. 180—9.1)

This invention relates to improvements in drive mechanisms for endless tractor tread vehicles, and particularly to vehicles of the kind subject to rigid limitations as to height, such as those used on loading machines in mines.

The principal object of the invention is to provide an especially efficient drive mechanism intimately associated with and forming a part of the tractor tread sprocket, which is adapted to provide auxiliary tractive effort when the treads are operating over muddy ground with the machine partially mired therein.

The invention may best be understood by reference to the accompanying drawings, in which:

Figure 2 is an exploded perspective view of the main parts of the drive mechanism shown in Figure 1.

Figure 1:
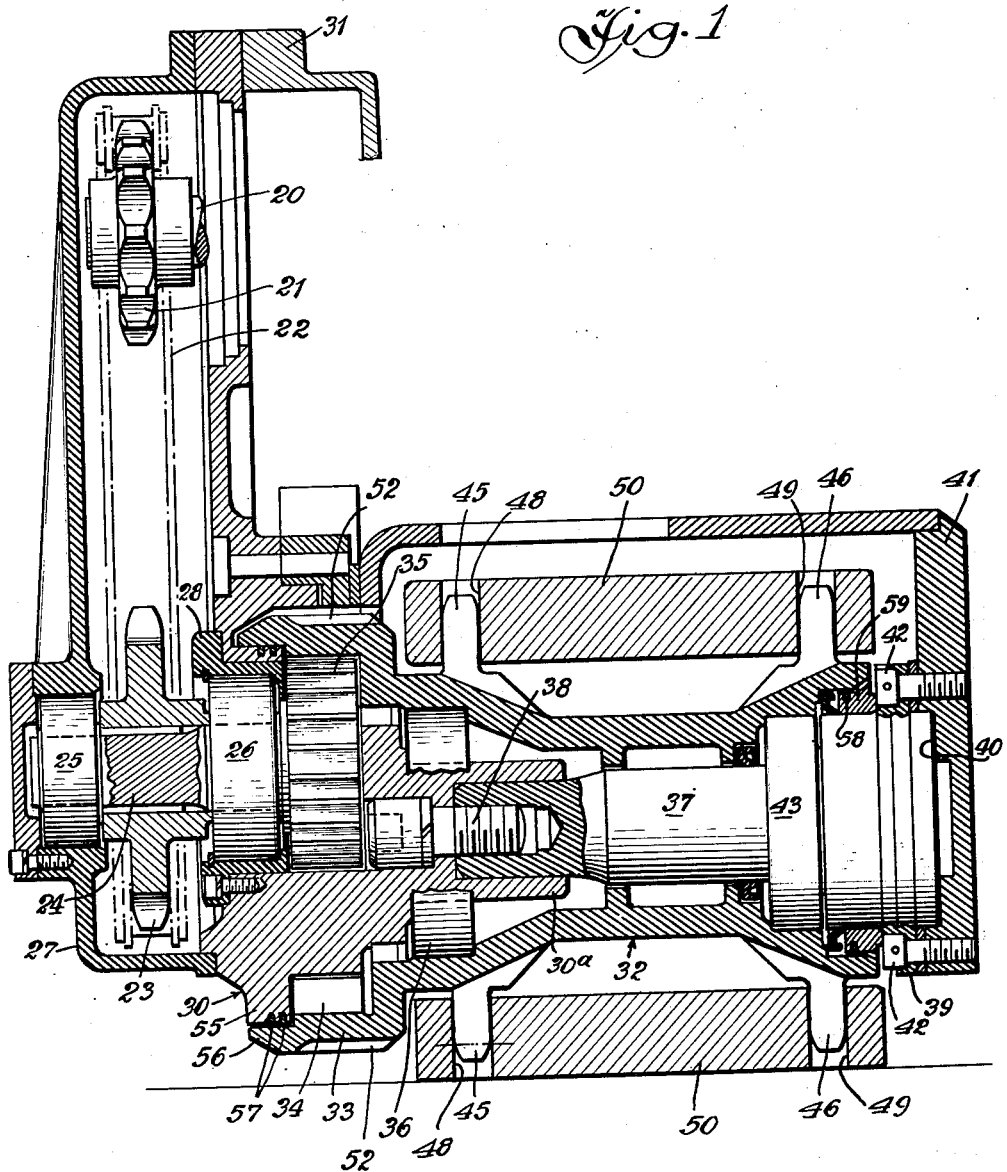
Figure 1 is a vertical section of a tractor tread drive mechanism embodying my invention.

In the illustrative embodiment of my invention shown in the drawings, the same is shown as applied to a form of planetary internal gear drive mechanism of the general type disclosed in my prior application, Serial Number 260,349, filed December 7, 1951, now Patent No. 2,637,603, dated May 5, 1953, which mechanism is especially designed for a loading machine of minimum height, but which is modified in important respects for the purposes of my present invention.

The drive mechanism is driven from a shaft 20 suitably connected to a drive motor (not shown) on the vehicle frame. A chain sprocket 21 on said shaft has a chain 22 with a sprocket 23 keyed on stub shaft 24. Said stub shaft is journalled in bearings 25 and 26, the inner bearing 26 being seated in a supporting ring 28 suitably fixed in a bore 29 of a housing 30 and the outer bearing 25 being seated in outer member 27. Said housing consists of a casting of irregular shape which extends upwardly for connection to a side plate 31 of the vehicle frame, and also provides support for one end of a hollow tread driving sprocket indicated generally at 32.

As will be seen in Figure 1, the tread drive sprocket 32 includes an enlarged ring gear portion 33 at one end having an internal gear 34 therein, which is engaged by a spur gear 35 fixed on the inner end of stub shaft 24. The axis of the tread drive sprocket 32 is disposed parallel to but considerably below the axis of shaft 24, and the housing 30 has an inwardly projecting hollow hub 30a formed integral therewith on which an antifriction bearing 36 is mounted for rotatably supporting the adjacent end of the tread drive sprocket 32 adjacent its enlarged outer end portion 33.

An extended sprocket support shaft 37 has one end mounted in the hollow hub 30a of housing 30 and is secured therein by a bolt 38. The opposite end of said shaft 37 is seated in a recess 40 in a fixed side plate 41 of the vehicle frame, and secured therein as by a retaining ring 39 fixed by bolts 42, 42. Antifriction bearings 43 are seated on the shaft 37 for rotatably supporting the inner end of the tread drive sprocket 32.

The tread drive sprocket 32 has two rows of sprocket teeth, 45, 46 around the body thereof, one of said rows 45 being spaced axially inwardly of the enlarged ring gear portion 33 and the internal gear 34, and the other row 46 being disposed adjacent the opposite end of said drive sprocket. Said sprocket teeth are adapted for engagement in corresponding rows of recesses 48, 49 formed along the upper faces of tread blocks or links 50, 50 which are pivotally connected together as usual to form one of the endless treads for the vehicle.

As will be seen from Figure 1, the exterior diameter of the enlarged ring gear portion 33 is substantially the same as the pitch diameter of the tread driving sprocket teeth 45, 46 and the exterior surface of said ring gear portion is provided with longitudinally extending flutes 52, 52.

The arrangement just described is such that, when the vehicle is being driven over firm ground, the periphery of the ring gear portion 33, with its flutes 52, 52, will be supported above the ground level by reason of the thickness of the tread links 50, 50 on the tread sprocket 32. However, when the vehicle is being operated on soft or muddy ground and the tread links sink into the surface, the fluted periphery of the ring gear portion 33 will engage the ground, rotating at substantially the same peripheral speed as the driving speed of the tread links. In this manner, the ring gear portion 33 presents a "live" traction surface to assist in driving the vehicle at times when it is most needed.

The opposite ends of the tread sprocket 32 are seated against ingress of mud and dust. In the form shown herein, an annular hub portion 55 on the housing 30 has close-fitting engagement with a lip 56 on the end of ring gear portion 33, and has a pair of sealing rings 57, 57, which may be similar to conventional piston rings, seated therein and engaging the inner face of said lip 56. The opposite end of the tread sprocket is sealed by a sealing ring 58 seated in an end ring 59 suitably fixed on shaft 37.

It will be observed that, in addition to affording assistance to the tractive effort of the tread links under certain conditions of operation of the machine, as previously described, my novel construction of drive mechanism makes it possible to provide a greater gear reduction within the same vertical space limitations, since the ring gear portion 33 is a "live" traction part, moving in unison with the tread links, and it is therefore unnecessary to be concerned with the possibility that the housing 30 (about which the ring gear portion rotates) may not have sufficient clearance above the ground while the tractor treads are in operation.

Although I have shown and described a certain embodiment of my invention, it will be understood that I do not wish to be limited to the exact construction shown and described, but that various changes and modifications may be made without departing from the spirit and scope of the invention as defined in the appended claim.

I claim:

In a drive mechanism for tractor treads, a hollow tractor tread sprocket having peripheral sprocket teeth for engaging a tractor tread, and an enlarged concentric end portion spaced axially beyond said sprocket teeth, the periphery of said enlarged end portion having a traction surface of substantially the same diameter as the outer ends of said sprocket teeth, said enlarged portion also having an internal gear therein, a housing for supporting said sprocket, including bearings at opposite ends thereof, disposed inwardly of said internal gear, and a drive shaft for said sprocket journalled in said housing on an axis offset above the axis of said sprocket, and having a spur gear fixed thereon meshed with said internal gear, said housing also including an arcuate bearing member having fitting engagement in the enlarged end portion of said sprocket for sealing the latter.

FRANK CARTLIDGE.

References Cited in the file of this patent

UNITED STATES PATENTS

| Number | Name | Date |
|---|---|---|
| 1,395,029 | Best | Oct. 25, 1921 |
| 1,669,345 | Owens | May 8, 1928 |
| 2,395,333 | White | Feb. 19, 1946 |
| 2,518,481 | Maguire | Aug. 15, 1950 |